United States Patent [19]

Bixby

[11] 4,295,496

[45] Oct. 20, 1981

[54] HOSE WITH INTERNAL INSERT MEMBER

[75] Inventor: Guy T. Bixby, Longmont, Colo.

[73] Assignee: The Gates Rubber Company, Denver, Colo.

[21] Appl. No.: 122,784

[22] Filed: Feb. 19, 1980

[51] Int. Cl.³ .......................... F16L 11/00; F16L 9/00
[52] U.S. Cl. .................................. 138/122; 138/125; 138/131; 138/132; 138/174
[58] Field of Search ............... 138/122, 121, 131, 132, 138/133, 139, 174, 178, 125, 126, DIG. 8

[56] References Cited

U.S. PATENT DOCUMENTS 2,917,568 12/1959 Moorman et al. .................. 138/131
3,288,170 11/1966 Haren ................................. 138/125
3,300,571 1/1967 Downey et al. .................... 138/131
3,755,032 8/1973 Higbee .............................. 138/125
3,889,717 6/1975 Obadal et al. ..................... 138/178
4,091,063 5/1978 Logan ............................... 138/125

Primary Examiner—Willis Little
Attorney, Agent, or Firm—Curtis H. Castleman, Jr.; Raymond Fink; H. W. Oberg, Jr.

[57] ABSTRACT

A hose is described having the usual elongated polymeric body and a coiled insert member formed of a plurality of turns contained within the internal passageway of the hose. The hose body has a normal tendency to swell under elevated temperatures or pressure whereby the coiled insert member may shift axially. This problem is solved by application of a filamentary band of expansion resistant material extending circumferentially about the hose body, which prevents enlargement of the hose during use at elevated temperatures.

25 Claims, 6 Drawing Figures

HOSE WITH INTERNAL INSERT MEMBER

BACKGROUND OF THE INVENTION

This invention relates to flexible hose having spring inserts in the passageway thereof, such as corrugated hose with internal convolutions in which turns of the coiled insert are retained.

Various flexible automotive and industrial hoses, such as radiator hose and air brake hose incorporate spring inserts of annular or spiral corrugated form to resist collapse of the hose under reduced pressures or bending. The hoses usually have a textile knit, braid or other reinforcement to withstand elevated internal pressures. For instance, in an automotive radiator hose application, temperatures typically may reach about 270 degrees F., and internal pressures rise to about 20 psig. Under these conditions, with typical knit reinforcement members embedded in the hose wall, the hose may swell (radially) from about 4 to about 15 percent. This enlargement of the hose may in turn lead to disengagement of the coiled insert from the corrugations formed in the internal passageway of the hose. The coiled spring may migrate to the extent of being fully expelled from the hose and in the case of an automotive cooling system lodge itself in the thermostat, water pump impeller or other area causing damage.

It is an object of the present invention to provide means of simple construction for preventing enlargement of the hose along an intermediate portion thereof and to thereby ensure retention of the spring insert within the hose. It is another object to provide an inexpensive method for achieving the improved hose construction.

SUMMARY OF THE INVENTION

In one aspect, the invention pertains to a hose having an elongated polymeric body and a coiled insert member formed of a plurality of turns and positioned in the internal passageway of the hose body. The hose body normally has a tendency to swell during use under conditions of elevated temperature or pressure. The invention is drawn to the use of a filamentary band which is integral with the polymeric body and which extends generally circumferentially of the body, preferably embedded in the hose wall, and has filaments resistant to expansion at elevated temperature or pressure. The band is positioned between at least two adjacent turns of the coiled insert member, whereby during use at temperatures or pressures sufficient to swell unbanded portions of the hose body, the portion of the hose carrying the filamentary band is constricted in inside dimension thereby precluding axial shifting or dislodgement of the coiled insert member from the hose passageway.

In another aspect, the invention pertains to a method for forming a flexible hose having a spring insert in the internal passageway thereof, including the steps of forming a heat setting polymeric tube, twining a textile reinforcement over the tube; applying a cover of heat setting polymeric material over the reinforcement layer; wrapping a filamentary band formed of filaments resistant to expansion at elevated temperatures, of narrow width compared to the length of the hose, over an intermediate portion of the cover or textile reinforcement; heat setting the hose to form a unitary hose body; and inserting a coiled member having a plurality of turns into the internal passageway of the hose, such that the filamentary band becomes positioned between at least two adjacent turns of the coiled member.

BRIEF DESCRIPTION OF THE DRAWINGS

The invention and its preferred embodiments will be described more fully with reference to the accompanying drawings, in which like numerals designate like parts, and in which.

PREFERRED EMBODIMENTS OF THE INVENTION

Figure 1:
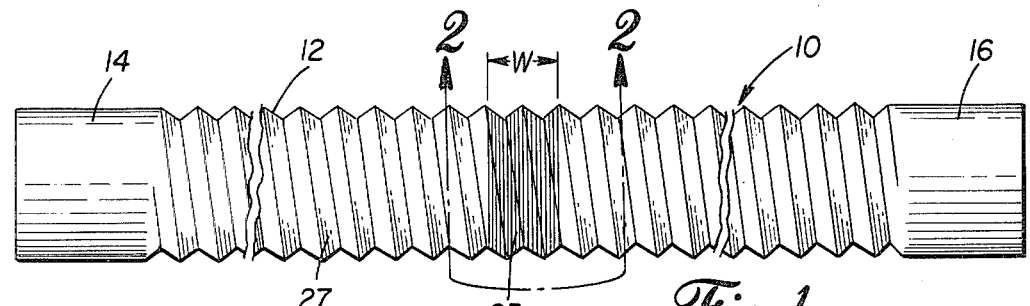
FIG. 1 is a side view of a molded corrugated hose in accordance with the invention.
Figure 2:
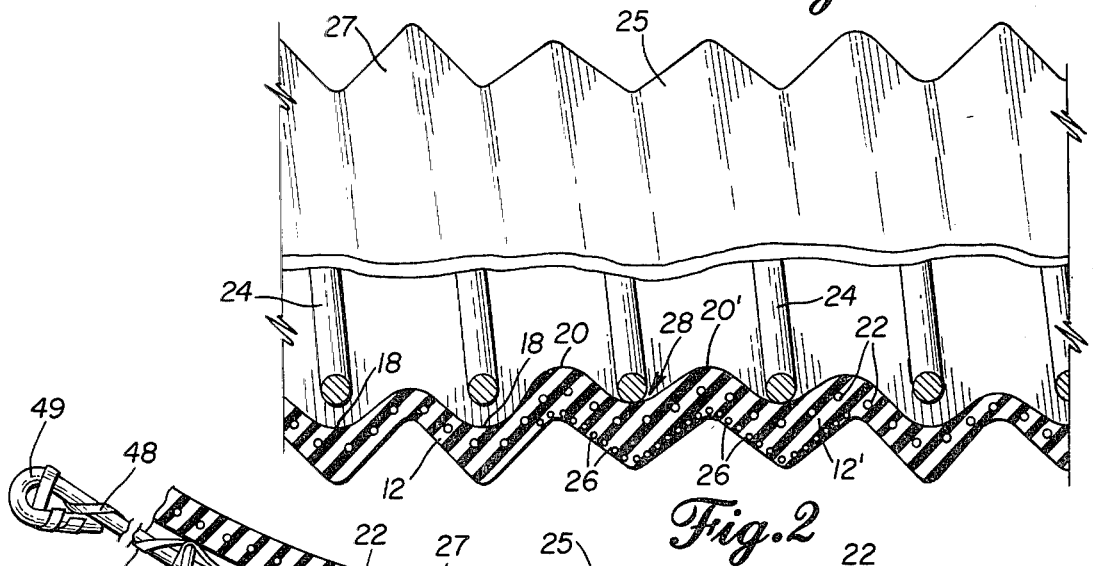
FIG. 2 is an enlarged partial sectional view along 2—2 of FIG. 1, however showing swelling of unbanded portions of the hose which have been subjected to elevated operating temperatures and/or pressures.

Referring first to FIGS. 1 and 2, there is shown a hose generally at 10 including an elongated polymeric body 12 of corrugated configuration, terminating in a pair of cuffs 14, 16 of the same or different size adapted to be coupled or clamped to appropriate fittings. The internal passageway of the hose is defined by helical convolutions or troughs 18 and intermediate crests 20. Embedded in the wall of the hose is reinforcement 22 which may be in form of braid, spiral, knit or similar textile, plastic or other reinforcement which, because of material or configuration, permits the hose to swell at the elevated temperatures and pressures encountered during operation of the hose. Typical textile reinforcement materials include nylon, polyester, rayon and the like. The exterior of the hose may be corrugated also, as shown, to provide flexibility.

The polymeric materials used for the hose body may be thermoplastic, however are more preferably selected from various elastomers including natural and synthetic rubbers such as neoprene, EPDM, and the like.

With the internal convolutions of the hose are seated turns 24 of a continuous helical spring coil formed of appropriate corrosion resistant metal or other high modulus material chosen to provide the collapse resistance needed to meet specified conditions, e.g., galvanized steel wire.

In accordance with the invention, the hose is provided with a filamentary band 25 which is integral with the polymeric hose wall 12, preferably embedded therein, and which extends generally circumferentially of the body as shown in FIG. 1. The band is comprised of filaments 26 which preferably extend circumferentially of the hose body or at a bias angle (a component of which extends circumferentially of the body), and the filaments being formed of a material resistant to expansion at elevated temperature or pressure. The band material is preferably formed of filament constructions which have a negative coefficient of thermal expansion, such as polyester. However, additional materials including stable length materials such as fiber glass, wire and aramids are useful. The important factor is that, under conditions of use at elevated temperature or pressure, the thus banded portion of the hose is resistant to expansion.

The width w of the filamentary band is preferably narrow in comparison to the length of the hose. Generally the purposes of the invention are satisfied by using a band of, say, ¼ inch provided the band is positioned between two adjacent turns 24 of the inserted coil. In this manner, there will always be a crest 20' along the internal wall which will extend radially inwardly of adjacent turns of the helical coil, thereby preventing its dislodgement or substantial axial shifting to the extent that a turn of the coil could lose registration with its corresponding trough 18.

A plurality of spaced banded portions 25 may be employed, as required.

Figure 4:
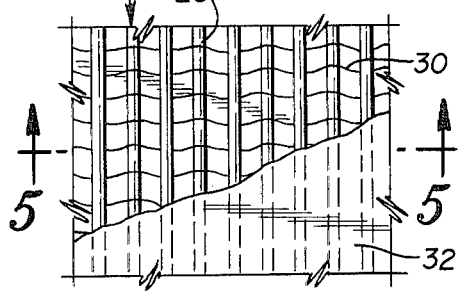
FIG. 4 is a top plan, partial cutaway view of a rubberized filamentary band in accordance with the invention.
Figure 5:
FIG. 5 is a sectional view along line 5—5 of FIG. 4.

During use of the hose under pressures exceeding about 10 psig at elevated temperatures exceeding about 120 degrees F., for instance, and depending upon the exact construction, unbanded portions of the hose 27 will generally swell from about 4 to about 15 percent. This in turn may cause a concurrent thinning of the hose wall 12, and in the radial displacement of the hose wall away from turns 24 of the helical coil as shown in FIG. 2. The banded portion 25 of the hose, in contrast, either maintains its dimension substantially, internal and external, or actually shrinks to a slight degree, whereby turns 24 of the helical coil are maintained substantially in the bottom of troughs 18 as shown generally at 28. The wall of the hose in the banded, constricted zone 25 retains its original wall thickness 12', thicker than the wall portion 12 of the unbanded portion 27 of the hose. Actually, even prior to swelling (FIG. 1), the wall 12' will be somewhat thicker than the wall 12 of the unbanded portion 27 by virtue of the extra material represented by the band itself, and/or any coating or layer associated therewith (see FIGS. 4 and 5), and by virtue of the molding process (if used).

In general, during operation at about 140 degrees F., and 15 psig internal pressure, the inside dimension of the constricted banded portion 25 will be preferably from about 75 to about 95 percent and more preferably from about 85 to about 90 percent of the inside dimension of the swollen portions 27.

A method for forming the hose of FIG. 1 of the invention includes the steps of forming a heat setting tube by extrusion or the like, twining a textile reinforcement 22 over the tube by braiding, knitting, spiralling, wrapping or the like, and then applying such as by extrusion a cover of heat setting polymeric material over the reinforcement layer. Although the filamentary band 25 may be wrapped over the reinforcement 22 prior to covering, or otherwise finally embedded within the wall 12' of the hose, it is preferred to apply the band substantially at the external surface of the hose. This may be accomplished in any desired manner such as by wrapping, spiralling or the like. In one preferred technique, referring to FIGS. 4 and 5, the filamentary band 25 is formed of fabric having warp filaments 26 and spaced pick filaments 30 running transverse thereto. This tire cord type of fabric is preferably calendered with a friction or skim coat 32 of rubber or other elastomeric material on at least one face thereof. Layer 32 is formed of a material compatible with the elastomer 12 forming the body of the hose, to permit covulcanization or adhesion. The calendered band 25 is then wrapped circumferentially about the hose at the desired location with preferably an overlap portion to ensure proper integration with the hose during the molding operation.

Figure 6:
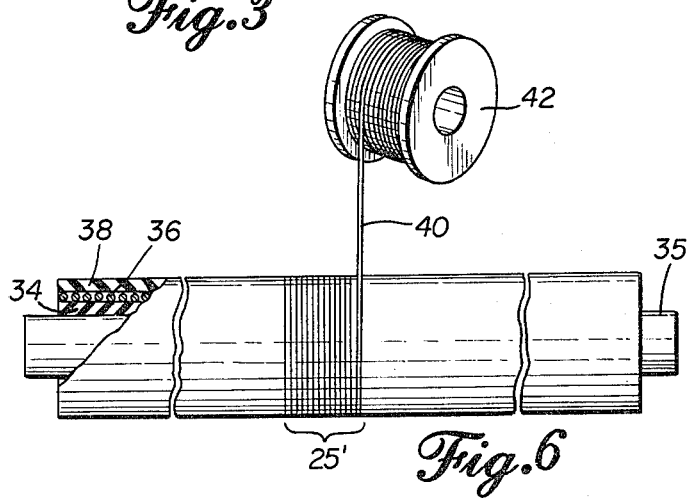
FIG. 6 depicts an alternative construction and method of building the hose.

Alternatively, referring to FIG. 6, the hose carcass consisting of tube 34, reinforcement 36 twined thereover, and cover 38 may be plied up on mandrel 35 in known manner, or formed without a mandrel as in the embodiment of FIG. 1, and then cord 40 is spiralled as a band 25' onto the outer surface of cover 38, such as by rotating mandrel 35. The cord 40 may carry a coating of adhesive or elastomer to ensure integration by bonding or embedment in the cover upon vulcanization. The uncured hose preform of FIG. 6 may be blow molded into a desired form such as the spiral corrugated form of FIG. 1 as taught more fully in U.S. Pat. No. 3,274,316 to Songer, open-steam cured in straight walled form, or formed by any other desired technique.

Figure 3:
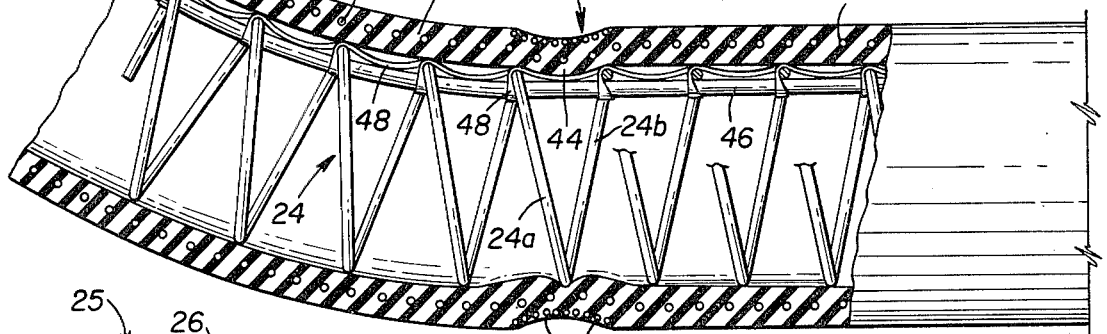
FIG. 3 is a partial axial sectional view showing an alternative embodiment of the invention.

In FIG. 3, there is shown a hose having smooth cylindrical interior and exterior surfaces with a reinforcement 22 embedded in the polymeric wall 12 of the hose. A filamentary band 25 comprised of filaments 26 is wrapped about an intermediate portion of the hose similar to FIG. 1, spanning turns 24a and 24b of the helical coiled insert reinforcement. As in the embodiment of FIG. 1, the banded portion 25 of the hose is constricted, and thereby forms an interior crest 44 between coils 24a and 24b, which prevents axial dislodgement of the spring. This hose is also deformable to a desired shape-retaining curved configuration, as shown, with the aid of a deformable rod insert 46 which is joined to the helical coil 24 with the aid of a continuous tie band 48, attaching the rod and coil together with a half-hitch interconnection at each juncture, as more fully taught in copending U.S. Application Ser. No. 122,783, filed Feb. 19, 1980 filed on even date herewith, and hereby incorporated by reference. As shown, the rod means 46 has been deformed beyond its yield point at the curve portion of the hose into a shape-retaining curved configuration. The hose and rod may be redeformed to assume any other desired curved configuration. The end 49 of the rod may be looped and the band secured there.

While certain representative embodiments and details have been shown for the purpose of illustrating the invention, it will be apparent to those skilled in this art that various changes and modifications may be made therein without departing from the spirit or scope of the invention.

What is claimed is:

1. In a hose having an elongated polymeric body and a coiled insert member formed of a plurality of turns and positioned in the internal passageway of the hose body, said hose body having a tendency to swell during use under conditions of elevated temperature or pressure, the improvement comprising:
a filamentary annular band integral with the polymeric body and which extends generally circumferentially of the body, having filaments resistant to expansion at elevated temperature or pressure, the band having a width substantially less than that of the hose body and being positioned between at least two adjacent turns of the coiled insert member.

2. The hose of claim 1 wherein during use at temperatures or pressures sufficient to have caused unbanded portions of the hose body to swell, the portion of the hose carrying the filamentary band is constricted in inside dimension compared to unbanded portions thereby precluding axial dislodgement of the coiled insert member from the hose passageway.

3. The hose of claim 2 wherein the inside dimension of the constricted portion carrying the filamentary band is from about 75 to about 95 percent of the corresponding inside dimension of unbanded portions.

4. The hose of claim 1 wherein the filamentary band is comprised of a textile filament construction having a negative coefficient of thermal expansion.

5. The hose of claim 1 wherein a deformable rod means is attached to the coiled insert member whereby the hose may be deformed to a selected shape-retaining configuration.

6. In a molded hose having a polymeric body corrugated along its internal passageway defining alternate troughs and crests, a reinforcement embedded in the wall of the polymeric body, and a coiled insert member formed of a plurality of turns and positioned in the internal passageway, the polymeric body tending to swell (increase in outside dimension) during use at elevated temperature or pressure, the improvement comprising:

a filamentary band unitary with the polymeric body and extending generally circumferentially of the body, having filaments resistant to expansion at elevated temperature or pressure, positioned between at least two adjacent turns of the coiled insert member and wherein the width of the band is small in comparison to the length of the hose and the edges of the band are spaced substantially from respective ends of the hose.

7. The hose of claim 6 wherein the outside dimension or shape of the hose along the length of the hose adjacent the coiled insert member is substantially uniform at room temperature, whereas at elevated temperature the portion of the hose carrying the filamentary band is constricted in outside dimension contrasted with unbanded portions.

8. The hose of claim 7 wherein turns of the coiled insert member are contained in troughs of the constricted portion of the hose, precluding axial dislodgement of the coiled insert member from the internal passageway under normal use.

9. The hose of claim 6 wherein the filamentary band is comprised of a textile filament construction having a negative coefficient of thermal expansion.

10. In a molded rubber hose having a helically corrugated rubber body with a tube portion formed with alternating trough and crest convolutions along its inner wall, a cover portion, an annular knit reinforcement embedded in the wall of the rubber body, and a helically coiled insert member positioned in the internal passageway of the hose and having a plurality of turns adapted to be located in the trough convolutions of the tube portion, said rubber body having a tendency to swell during use under elevated temperature or pressure, the improvement comprising: a filamentary band unitary with the rubber body and extending generally circumferentially of the body and embedded therein, having filaments resistant to expansion at elevated temperature or pressure, positioned between at least two adjacent turns of the coiled insert member and wherein the width of the band is small in comparison to the length of the hose and the edges of the band are spaced substantially from respective ends of the hose.

11. The hose of claim 10 wherein during use at temperatures or pressures sufficient to have caused unbanded portions of the hose body to swell, the portion of the hose carrying the filamentary band is constricted in inside dimension compared to unbanded portions thereby precluding axial dislodgement of the coiled insert member from the hose passageway.

12. The hose of claim 10 wherein the outside dimension or shape of the hose along the length of the hose adjacent the coiled insert member is substantially uniform at room temperature, whereas at elevated temperature the portion of the hose carrying the filamentary band is constricted in outside dimension contrasted with unbanded portions.

13. The hose of claim 10 wherein the filamentary band is comprised of a textile filament construction having a negative coefficient of thermal expansion.

14. The hose of claim 10 wherein the filamentary band is comprised of spaced cord members extending generally circumferentially about the hose, embedded in the cover portion of the hose.

15. The hose of claim 10 wherein the filamentary band is formed of cord helically wound in a substantially tight pack about a narrow intermediate segment of the cover portion of the hose, between adjacent turns of the insert member.

16. The hose of claim 10 wherein a deformable rod means is attached to the coiled insert member whereby the hose may be deformed to a selected shape-retaining configuration.

17. A method for forming a flexible hose having a spring insert in the internal passageway thereof, comprising:
forming a heat setting polymeric tube;
twining a textile reinforcement over the tube;
applying a cover of heat setting polymeric material over the reinforcement layer;
wrapping a filamentary band formed of filaments resistant to expansion at elevated temperatures, of narrow width compared to the length of the hose, over an intermediate portion of the cover or textile reinforcement;
heat setting the hose to form a unitary base body; and
inserting a coiled member having a plurality of turns into the internal passageway of the hose, such that the filamentary band is positioned intermediate at least two adjacent turns of the coiled member.

18. The method of claim 17 wherein the coiled member is inserted into the hose prior to heat setting the hose.

19. The method of claim 17 wherein the tube and cover are formed of elastomers and the hose is heat set by vulcanizing within an external mold under heat and pressure.

20. The method of claim 17 wherein the wall of the hose, after heat setting, is thicker along the portion carrying the filamentary band than along unbanded portions.

21. In a hose having an elongated polymeric body and a coiled insert member formed of a plurality of turns and positioned in the internal passageway of the hose body, said hose body having a tendency to swell during use under conditions of elevated temperature or pressure, the improvement comprising:
a filamentary band integral with the polymeric body and which extends generally circumferentially of the body, having filaments resistant to expansion at elevated temperature or pressure, the band being positioned between at least two adjacent turns of the coiled insert member;
said filamentary band having a width which is small in comparison to the length of the hose, the edges of the band being spaced substantially from each end of the hose.

22. In a hose having an elongated polymeric body and a coiled insert member formed of a plurality of turns and positioned in the internal passageway of the hose body, said hose body having a tendency to swell during use under conditions of elevated temperature or pressure, the improvement comprising:
- a filamentary band integral with the polymeric body and which extends generally circumferentially of the body, having filaments resistant to expansion at elevated temperature or pressure, the band being positioned between at least two adjacent turns of the coiled insert member;
- said hose at its unbanded portions having a wall which is thinner than at corresponding wall portion(s) carrying the filamentary band.

23. In a molded hose having a polymeric body corrugated along its internal passageway defining alternate troughs and crests, a reinforcement embedded in the wall of the polymeric body, and a coiled insert member formed of a plurality of turns and positioned in the internal passageway, the polymeric body tending to swell (increase in outside dimension) during use at elevated temperature or pressure, the improvement comprising:
- a filamentary band unitary with the polymeric body and extending generally circumferentially of the body, having filaments resistant to expansion at elevated temperature or pressure, positioned between at least two adjacent turns of the coiled insert member and spaced substantially from respective ends of the hose;
- said hose having an outside shape or dimension along the length of the hose adjacent the coiled insert member which is substantially uniform at room temperature, whereas at elevated temperature the portion of the hose carrying the filamentary band is constricted in outside dimension contrasted with unbanded portions;
- the wall of the hose at unbanded portions being thinner than at corresponding wall portion(s) carrying the filamentary band.

24. In a molded rubber hose having a helically corrugated rubber body with a tube portion formed with alternating trough and crest convolutions along its inner wall, a cover portion, an annular knit reinforcement embedded in the wall of the rubber body, and a helically coiled insert member positioned in the internal passageway of the hose and having a plurality of turns adapted to be located in the trough convolutions of the tube portion, said rubber body having a tendency to swell during use under elevated temperature or pressure, the improvement comprising:
- a filamentary band comprised of a textile filament construction having a negative coefficient of thermal expansion unitary with the rubber body and extending generally circumferentially of the body and embedded therein, the filaments of which are resistant to expansion at elevated temperature or pressure and which are positioned between at least two adjacent turns of the coiled insert member and spaced substantially from respective ends of the hose;
- the wall of the hose at unbanded portions being thinner than at corresponding wall portion(s) carrying the filamentary band.

25. In a hose having an elongated polymeric body and coiled insert member formed of a plurality of turns and positioned in the internal passageway of the hose body, said hose body having a tendency to swell during use under conditions of elevated temperature or pressure, the improvement comprising:
- a filamentary annular band embedded in the polymeric body and which extends generally circumferentially of the body, having filaments closely spaced together and which are resistant to expansion at elevated temperature or pressure, the band having a width substantially less than that of the hose body.

* * * * *